US005719930A

United States Patent [19]
MacDonald et al.

[11] Patent Number: 5,719,930
[45] Date of Patent: Feb. 17, 1998

[54] METHOD OF VOLUME SCREENING SIGNALLING MESSAGES IN A TELECOMMUNICATION SYSTEM

[75] Inventors: Douglas Malcolm MacDonald; Frederick Joseph Kaudel, both of Ottawa, Canada

[73] Assignee: Bell Canada, Montreal, Canada

[21] Appl. No.: 677,722

[22] Filed: Jul. 8, 1996

[51] Int. Cl.⁶ .................................................. H04M 3/22
[52] U.S. Cl. ........................ 379/229; 379/207; 379/230; 379/279; 370/236; 370/410; 370/426
[58] Field of Search .................. 379/229, 230, 379/231, 232, 207, 219, 220, 221, 269, 279, 111, 112, 113, 133, 134, 137, 138, 139; 370/229, 230, 231, 232, 233, 234, 235, 236, 237, 238, 426, 410, 252, 253

[56] References Cited

U.S. PATENT DOCUMENTS

| | | | |
|---|---|---|---|
| 4,224,479 | 9/1980 | Crawford | 379/134 |
| 4,497,978 | 2/1985 | Schoute et al. | 379/279 |
| 4,511,762 | 4/1985 | Stockdale | 379/279 |
| 4,564,725 | 1/1986 | Daisenberger | 379/138 |
| 4,613,729 | 9/1986 | Daisenberger | 379/113 |
| 4,626,624 | 12/1986 | Daisenberger | 379/137 |
| 4,626,625 | 12/1986 | Daisenberger | 379/137 |
| 4,629,830 | 12/1986 | Daisenberger | 340/825.03 |
| 4,907,256 | 3/1990 | Higuchi et al. | 379/137 |
| 5,060,258 | 10/1991 | Turner | 379/134 |
| 5,438,570 | 8/1995 | Karras et al. | 370/426 |
| 5,521,905 | 5/1996 | Oda et al. | 370/232 |
| 5,592,530 | 1/1997 | Brockman et al. | 370/252 |

FOREIGN PATENT DOCUMENTS

| | | | |
|---|---|---|---|
| 0 426 355 A3 | 10/1990 | European Pat. Off. | H04Q 3/00 |
| WO94/00958 | 6/1993 | WIPO | H04Q 3/66 |

OTHER PUBLICATIONS

*New Call Gapping Algorithm for Network Traffic Management*, P.M.D. Turner and P.B. Key, Teletraffic and Datatraffic in a Period of Change, vol. 14, 13th International Teletraffic Congress, Copenhagen 1991, pp. 121–126.

*Primary Examiner*—Krista Zele
*Assistant Examiner*—Scott Wolinsky
*Attorney, Agent, or Firm*—Thomas Adams & Assoc.

[57] ABSTRACT

A method of volume screening signalling messages in a communications signalling system, in which control orders from a centralized control are distributed so as to provide equitable volume screening of selected signalling messages being sent over each available communications link of a plurality of links within link sets that interconnect signal transfer points (STPs) of the system. This is achieved by dynamically apportioning the acceptance rate of the selected signalling messages from each available link, in the same proportion as that of the total signalling messages being sent over that available link.

7 Claims, 2 Drawing Sheets

5,719,930

METHOD OF VOLUME SCREENING SIGNALLING MESSAGES IN A TELECOMMUNICATION SYSTEM

FIELD OF THE INVENTION

This invention relates to the control of messages in a communications signalling system, and more particularly to a method of selectively limiting the rate messages of a particular type are allowed to continue to their destination, so as to reduce the tendency of such types of traffic to cause congestion of signalling routes, service processing means and/or message transfer means.

BACKGROUND OF THE INVENTION

Communication switching and signalling networks are subject to congestion and overload when the offered traffic is above the capacity of the network to handle the load. Various techniques have been developed to control such overload and congestion for particular situations. The communications switching system known as Signalling System No. 7 (SS No. 7) is one such system subject to overloads. An excellent tutorial on this system is given in an article entitled: "Signalling System No. 7: A Tutorial" by Abdi R. Modarressi and Ronald A. Skoog, IEEE Communications Magazine, July 1990, pp 19–35.

To alleviate overload conditions in the SS No. 7 system, some controls have been developed for blocking the transmission of selected messages under particular circumstances. However, these existing controls are either not selective to call type, or do not control the volume of the allowed messages. This is particularly important at certain SS No. 7 nodes, called Signal Transfer Points (STP), which provide an interface for connection of the signalling system of one telecommunications carrier to that of another.

The requirements for a function called "gateway screening" at this interface, have been specified for certain communications signalling network switching systems and are given in Appendix C, "STP Requirements for Gateway Function" in Bell Communications Research (Bellcore) TR-TSY-000082, "Signalling Transfer Point Generic requirements," (Issue 2, June 1987, Revised June 1990). This document defines a gateway screening capability which uses various criteria to determine whether messages offered to an STP should be muted normally to their destination or should be discarded. Such screening however, is pass/fail, and does not control the volume of messages offered in a period of time.

Other systems described in the prior art limit the volume of calls passing through them using such techniques as code blocking (rejecting a predetermined proportion of the calls dialled to a specific code). In addition, call gapping methods such as disclosed in U.S. Pat. No. 4,224,479 entitled "Method of Controlling Call Traffic in a Communication System" by Kenneth E. Crawford, and in U.S. Pat. No. 5,060,258 entitled "Call Traffic Control" by Peter M. D. Turner, also provide improved performance. A particularly effective call-gapping algorithm is described in Applicant's copending U.S. patent application Ser. No. 08/610,194, entitled "Method of Controlling Call Traffic in a Telecommunication System" by Douglas M. MacDonald.

Such methods are applicable in single-processor applications. However, SS No. 7 networks are frequently characterized by a distribution of the processing capability for message routing functions. For example, message decoding and routing may be provided using a processor within the circuits associated with each signalling link and dedicated to that link. At an STP, the required speed of processing may not allow the sending of a SS No. 7 message to a central processor for the determination of whether the message should be blocked based on the volume of messages through the STP. It is however, essential that any such distributed system provide equitable volume screening of all the messages distributed over the various links and that this must continue when one or more of the links becomes disabled or otherwise unserviceable.

SUMMARY OF THE INVENTION

A fundamental aspect of the SS No. 7 system is that message flows are, by design, generally to be equally divided over the available channels to the destination. However, failures in the network may cause such message flows to be unequally divided over the available paths. If messages (or some of a particular class of messages) are to be discarded, the probability of discarding a message should be spread fairly across the whole class of messages potentially affected, and the system should not discriminate against any subclass of messages within the total group. The present invention achieves this by providing a method of selectively controlling, on a distributed processor basis, the volume of messages received within a stream of messages with the offered traffic being controlled so as to ensure an equitable distribution of the allowed messages within the stream.

Thus in accordance with the present invention there is provided a method of controlling the volume of allowed signalling messages at signal points in a telecommunication system. The method includes examining signalling messages received on certain links within link sets; then selecting some of the signalling messages for analysis in accordance with screening parameters; determining whether to accept or reject the messages based on volume parameters; and finally dynamically apportioning the rate at which the selected signalling messages are accepted from each available link, in the same proportion as that of the total signalling messages sent over that available link.

BRIEF DESCRIPTION OF THE DRAWINGS

An example embodiment of the invention will now be described with reference to the accompanying drawings in which.

DESCRIPTION OF PREFERRED EMBODIMENT

Figure 1:
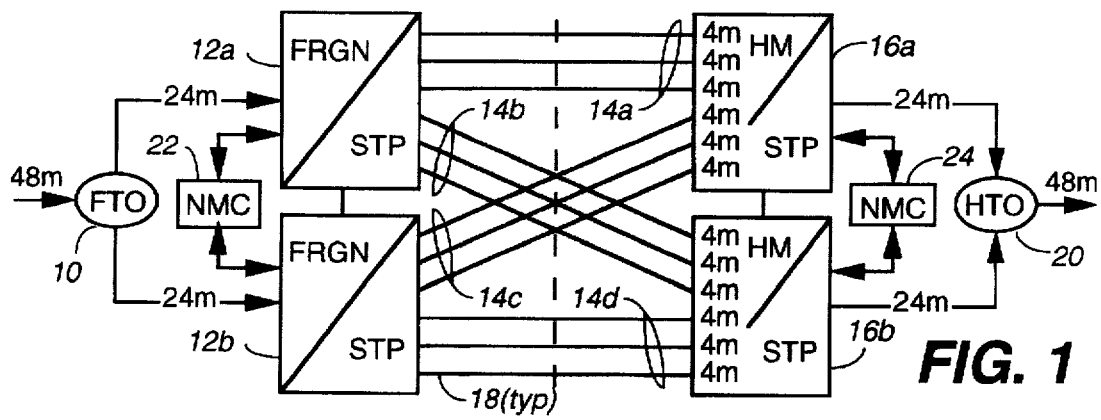
FIG. 1 is a block diagram of signalling transfer facilities in a telecommunication system, in accordance with the invention.

In the following description, identical elements which perform the same function, are identified by the same reference numerals followed by a different reference character. To facilitate an understanding of the invention, only the reference numeral will be given, except where reference to a specific element is made. In addition, FIGS. 1 to 4 illustrate four operating conditions of the same signalling transfer system. Only the structure of FIG. 1 will be described in detail, with limited reference to the other FIGS. as required.

FIG. 1 illustrates the signal transfer facilities of two telecommunications carriers such as in a telecommunication system, designated "foreign" (FRGN) and "home" (HM). The direction of signal traffic will only be described as flowing from the foreign carrier to the home carrier. It will be understood however, that signal traffic flow in an operating system is bidirectional and the invention can be applied equally in both directions.

In a typical signalling system of a telephone system, such as Signalling System No. 7 (SS No. 7), signalling messages are used for network management, routing long-distance telephone calls, billing long-distance telephone calls, and controlling other functions associated with the operation of a telephone system. To maintain a high degree of reliability and robustness in the signalling system, all major sections are typically duplicated. Under normal operating conditions, signalling messages transmitted through the system are divided equally between the duplicated facilities. Should any portion of the system be rendered unserviceable, the duplicated facility will assume full control and all messages will be routed through it until the full system is restored.

Thus, in the illustrated embodiment of the signal transfer facilities, incoming signalling messages to a foreign toll office 10, are divided equally between a mated pair of foreign signal transfer points (STP) 12a and 12b. For illustrative purposes, 48m such incoming messages ("m" being the sending factor for the number of messages in a particular length of time) are shown as being divided equally 24m and 24m between the two foreign STPs 12. The 24m signalling messages from each STP 12 are apportioned equally and each portion of 12m signalling messages is sent over one of four interconnecting link sets 14 to one of a mated pair of home STPs 16. Each link set 14 has three links 18 over each of which 4m signalling messages are sent. If there were no gateway screening, all 24m signalling messages from each home STP 16 (48m in total), would be transmitted to a home toll office 20. Each mated pair of STPs 12 and 16 is under control of its own network management center (NMC) 22 and 24 respectively.

As illustrated, the foreign STPs 12 are cross-connected to the home STPs 16 in a "quad" configuration, to provide redundancy and robustness in the system. While only two mated pairs of STPs 12 and 16, are used to illustrate the invention, in a typical operating system many such mated pairs of STPs, as well as switching offices, and other facilities required to operate the telephone system, would be interconnected with the mated pairs of STPs 12 and 16.

Figure 2:
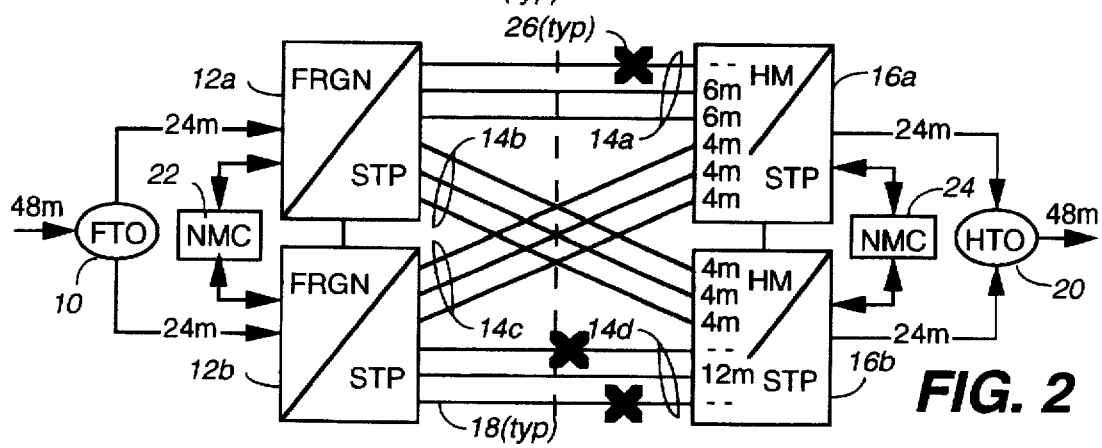
FIG. 2, FIG. 3 and FIG. 4 illustrate the signal transfer facilities illustrated in FIG. 1, under various operating conditions.
Figure 3:
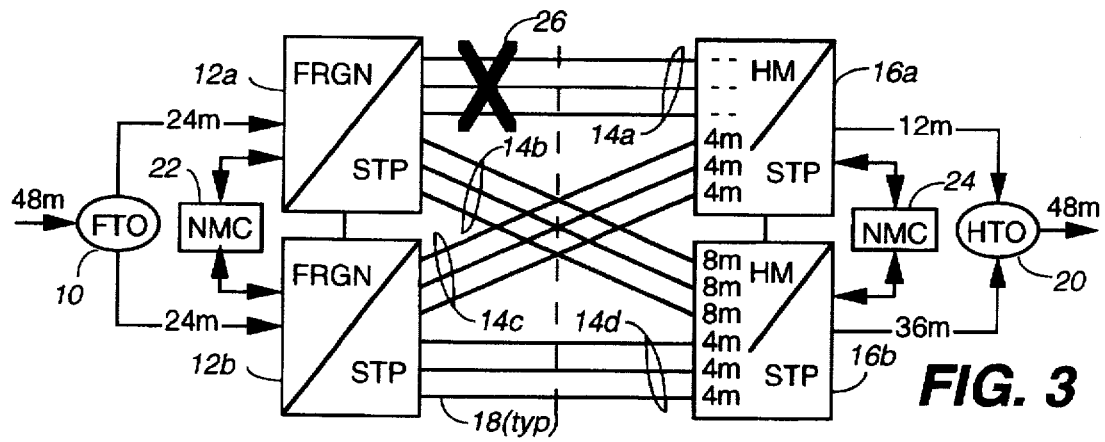
Figure 4:
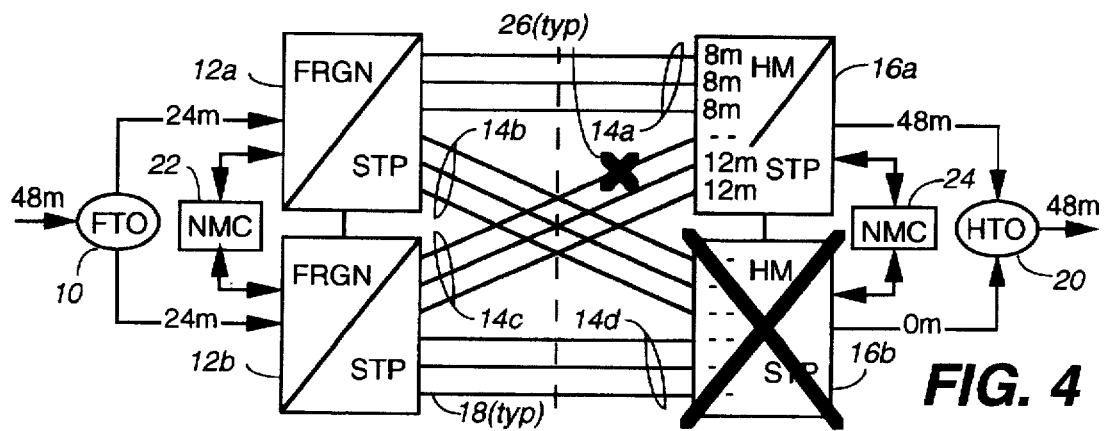

FIG. 2, FIG. 3 and FIG. 4 illustrate various operating conditions in which each heavy "X" 26 identifies an out-of service or otherwise disabled section of the system. As will be manifest from FIG. 2, whenever one or more of the links 18 of link sets 14a and 14d are disabled, the signal messages for that set 14 are reapportioned to the remaining available links 18 in each set 14 so that the set continues to carry the same proportion of the total traffic.

Only upon failure of a complete link set, such as set 14a shown in FIG. 3, are all 24m messages from the foreign STP 12a routed to the home STP 16b. Under these conditions, the home STP 16a will receive only 12m messages while the home STP 16b will receive 36m of the 48m messages from the mated pair 12.

As illustrated in FIG. 4 when there is a complete failure of the home STP 16b, all 48m signalling messages will be routed to the home STP 16a. Again in this case, the signalling messages will be apportioned equally amongst available links 18. Thus, with the failure of one of the links 18 of the link set 14c, as indicated by reference numerals 26, the 24m messages from the foreign STP 12b will be apportioned 12m over each available link 18 of link set 14c, while the 24m messages from the foreign STP 12a will be apportioned 8m messages over each of the three links 18 of the link set 14a. Only if there was a complete failure of, say, foreign STP 12a, would all 48m messages be routed through foreign STP 12b.

Superimposed on this system may be the known static gateway screening of messages described in the prior art. Otherwise, only the dynamic volume screening of the present invention is used to control the rate at which accepted messages are allowed to continue to their destination. In the latter case, if there was only one fixed rate of accepted signalling messages from each available link set 14 and in turn each available link 18 of that set, under failure conditions, the maximum allowed message rate would be less than the desired maximum and the probability of a message being rejected would differ depending on which route the message took through the network. This is a result of the dynamic apportioning of the signalling messages sent over the links 18, depending upon their availability. The home NMC 24 must ensure an equitable control over the rate of accepted messages. This is achieved by dynamically apportioning the rate the selected signalling messages are accepted by the mated pair of home STPs 16 and more particularly each of the available links 18 connected to the STPs 16 in the same proportion as that of the signalling messages sent over that link.

Figure 5:
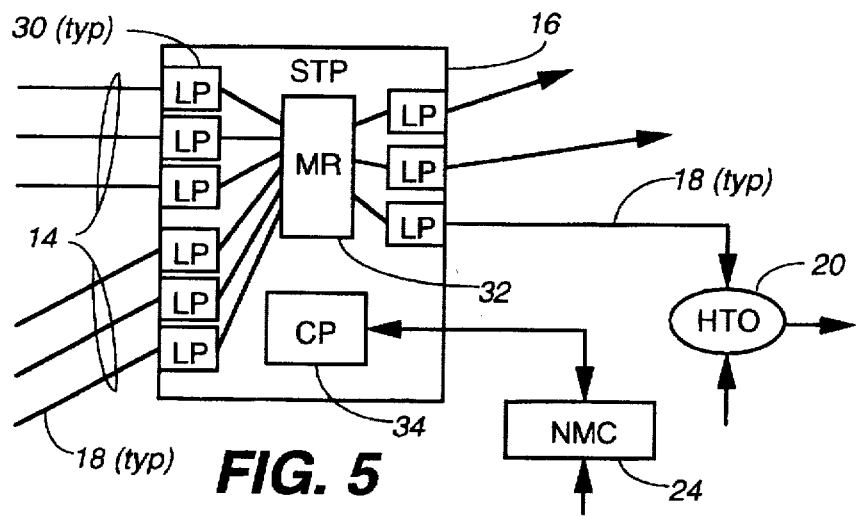
FIG. 5 illustrates in greater detail a typical one of the STPs illustrated in FIGS. 1 to 4.

A further understanding of the structure and operation of the invention will be understood from FIG. 5 which illustrates in greater detail one of the STPs 16 (or also 12), which is typical of those illustrated in FIGS. 1 to 4. The STP 16 includes a link processor 30 for each of the links 18 of the link sets 14 connected thereto. Each link processor 30 routes messages from its associated link 18 to a message router 32, which in turn, routes the messages through the STP 16. A centralized processor 34, which controls functions common to more than one link 18, is under control of the network management center 24. The latter provides overall control of each pair of STPs 16 as illustrated in FIG. 1. Referring again to FIG. 5, one of the output links 18 is shown connected to the home toll office 20. Also illustrated are additional output links 18 which would be connected to other toll offices or facilities of the network, again in a well known manner. It will be understood that each of the STPs 12 and 16 is bidirectional and that they control the flow of message signals in both directions throughout the network.

In practice, the method of the present invention has two sets of processes operating simultaneously: i) SS No. 7 Message Processing and ii) Parameter Setting. These are described in the following sections.

SS No. 7 Message Processing

Messages arriving on an SS No. 7 link 18 are examined and routed by the associated link processor 30, which may perform several functions in a well known manner. For example, GATEWAY SCREENING, if applicable will generally be performed first, followed by message header ANALYSIS AND ROUTING. The method for VOLUME SCREENING messages in accordance with the present invention, would come between these two known processing steps, as illustrated in the flow chart of FIG. 6.

Figure 6:
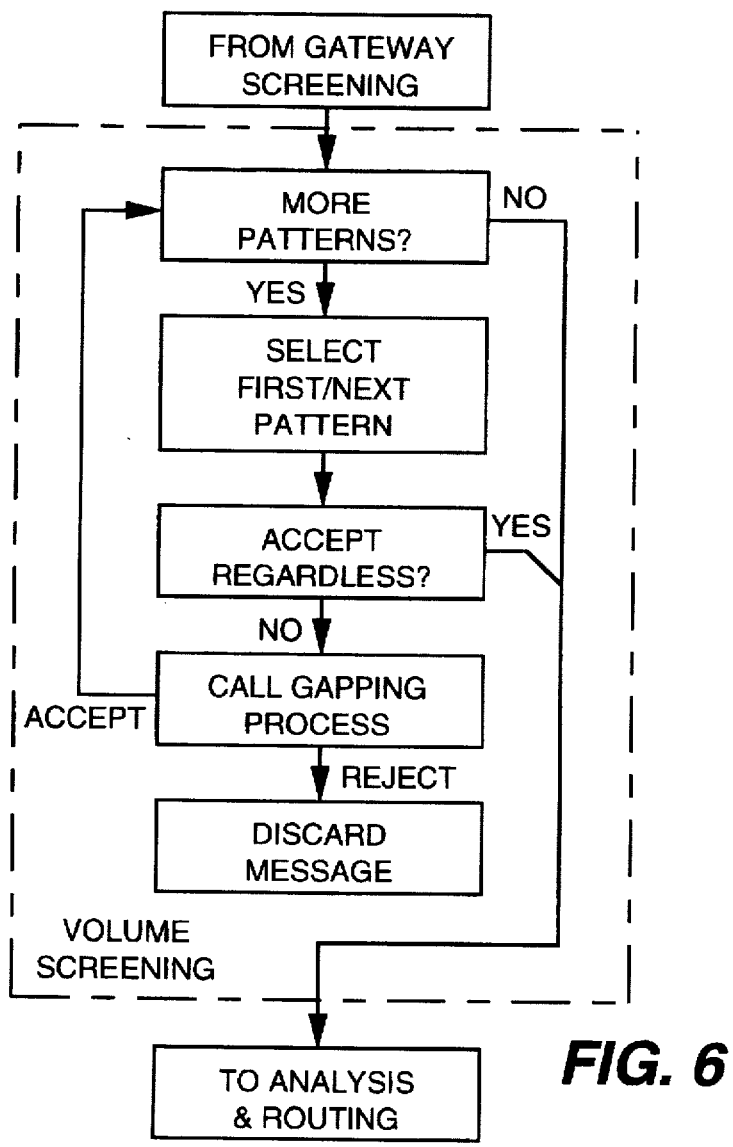
FIG. 6 is a flow chart of a volume screening process in accordance with the invention, implemented in the signal transfer facilities of FIGS. 1 to 4.

At any given time, a particular link processor 30 may be subject to zero, one or more different Link Orders. When an SS No. 7 signalling message has successfully passed GATE- WAY SCREENING utilizing known processing steps, the link processor 30 performs VOLUME SCREENING as shown in FIG. 6. Initially, the volume screening process tries to match the message with one or more patterns, which will be described in more detail later. If no PATTERNS are active, the message is immediately passed on to the regular message processing for ANALYSIS AND ROUTING. Otherwise the FIRST PATTERN is selected and tested to determine if there is a match with the message. If not, additional patterns, if any, are checked for a match with the message. If the message matches a pattern, it is first checked to see whether it should be ACCEPTED REGARDLESS of other patterns and sent for regular ANALYSIS AND ROUTING. If not, the CALL GAPPING PROCESS determines whether the message should be accepted or rejected. This process may be any one of the above referenced gapping methods of the prior art, used for volume screening. If the message is accepted by the CALL GAPPING PROCESS, it returns to continue PATTERN checking. The result of the VOLUME SCREENING process of FIG. 6 is that a message is either accepted and sent for further processing, or rejected, having matched one of the patterns and been rejected and hence DISCARDED, by the CALL GAPPING PROCESS for that pattern.

Parameter Setting

Based on external factors, the home network management center (NMC) 24 determines the maximum acceptance rate of a particular class of messages. For the purposes of this description, this will be called the network management (NM) Selection. The calculation of this maximum, which is not specific to this invention, is based on such factors as intercompany contracts, engineering limits of the network equipment, failures of equipment in the network and external events (fire, flood, etc.). The class of messages to be controlled is specified with the following sets of parameters: the source of the messages (in this case the foreign STPs 12), the location implementing the control (here the home STPs 16), and the particular message type or pattern. The message pattern may be specified as those messages matching particular values of one or more of the message routing parameters. Typically contained in the message header, these parameters may include the following:

- accept regardless indicator which, if set, indicates that any message matching the pattern of this entry should be accepted, not discarded and sent for the analysis and routing of normal message processing;
- the service indicator (whether ISDN Signalling User Parts (ISUP), Transaction Capabilities Application-layer Protocol (TCAP) or other);
- message type (whether Initial Address Message (IAM), management or other);
- originating point code (the node number of the point which originated the message);
- destination point code (the node number of the point to which the message is destined);
- calling party address which may be further subdivided into entries for the following:
  address type;
  subsystem number (whether ISUP, or other);
  signalling point code;
  global title;
- called party address, which may be further subdivided into entries for the following:
  address type;
  subsystem number (whether ISUP, or other);
  signalling point code;
  global title.

The elements within a message pattern may optionally contain a special value, called a 'wild card' value, indicating that a message containing any value for this parameter will be deemed as matching for this parameter.

The maximum volume of messages to be allowed per time period is selected (or calculated) as appropriate and forms a set of gapping parameters associated with a specific message pattern. The particular method of controlling the volume may be implemented using one of several possible techniques, each of which is characterized using a plurality of parameters. For example, the technique of the above referenced Applicant's copending patent application uses three values (the heavy volume rate, the peaking factor and dropping factor) as prime call gapping parameters. The first of these is a time parameter (average inter-message time), the latter two parameters are ratios. The other parameters of the Applicant's copending Patent Application are of lesser significance in the call gapping process and are usually set to constant values. Other methods may use a specific gapping parameter such as the minimum period between successive messages.

In the illustrated embodiment, when the class of messages to be controlled and the maximum message volume is developed as the NM Selection, the NMC 24 develops messages, called STP Orders, to be sent to the central processors 34 in the individual home STPs 16. The messages consist of two parts similar to the NM Selection: the pattern of the messages to be controlled and the gapping parameters. While the message pattern parameters may be duplicated from the NM Selection, the call gapping parameters must be modified as follows:

- If all concerned STPs are working and all (4) quad routes are available, the volume is divided equally over the home STPs 16 as illustrated in FIG. 1.
- If only one of the quad link sets is unavailable, the volume (to the home STP e.g. 16a in FIG. 3, connecting with that link set 14a) is reduced to half and that portion allocated to the other home STP 16b. In this case a special indication is prepared indicating the specific link set affected.
- If both quad link sets from one foreign STP are unavailable but the ones from its mate are available, the volume is divided equally over the home STPs.
- If both quad link sets to one home STP are unavailable, the full volume is allocated to the other home STP.

While the latter two divisions are not specifically illustrated, they are self-evident from the illustrations given in FIGS. 1 to 4. Thus for each STP 16, a volume scaling (VS) parameter is calculated representing the portion of the NM Selection volume allocated to that particular STP.

The NMC 24 determines the Parameters to be sent by the STP Orders to each of the STPs 16, which in turn are forwarded either directly or indirectly to each of the link processors 30 therein. For the gapping process described in Applicant's copending application, a typical example of these four "Ratio or Fixed Parameters" is given in TABLE 1. If the gapping process described in Turner is used, only the "Global Counter Size" and the "Limit Counter Size" are required, while if the gapping process of Crawford is used, none of the four "Ratio or Fixed Parameters" are required.

TABLE 1

Volume Scaling from the NM Selection to the STP Order

| Ratio or Fixed Parameter | Type | NM Selection Value | Scaling Factor (VS) | STP Order Value | Equivalent Rate |
|---|---|---|---|---|---|
| Peaking Factor | ratio | 1.25 | N/A | 1.25 | |
| Dropping Factor | ratio | 2.5 | N/A | 2.5 | |
| Global Counter Size | fixed | 40 | N/A | 40 | |
| Limit Counter Size | fixed | 4 | N/A | 4 | |
| Gapping Interval Example from FIG. 1 | | | | | |
| STP 16a | time | 20.833 ms | 0.5 | 41.667 ms | 24/s |
| STP 16b | time | 20.833 ms | 0.5 | 41.667 ms | 24/s |
| Example from FIG. 3 | | | | | |
| STP 16a | time | 20.833 ms | 0.25 | 83.333 ms | 12/s |
| STP 16b | time | 20.833 ms | 0.75 | 27.778 ms | 36/s |

However, regardless of the message gapping algorithm used, a Gapping Interval must be included in each of the STP Orders. As will be manifest in the following, the Gapping Interval depends upon the status of the link sets 14 connected to the STPs 16. Thus, in the present example, if the NM Selection for a message type is 48 messages allowed per second, this is equivalent to an overall average call gapping interval of 20.833 ms for both STPs 16. When all links 18 are available as illustrated in FIG. 1, each STP 16 of the pair should accept up to 24 messages per second (equivalent to a call gapping interval of 41.667 ms).

For the operating conditions illustrated in FIG. 3, the message volume parameters of the message gapping algorithm in the STP Selections are calculated as shown in TABLE 1, where the volume parameters are scaled as follows:
ratio and fixed values are left constant count values are multiplied by the scaling factor, and
NM Selection time values are divided by the scaling factor.

Note that the "Equivalent Rate" (in messages per second) is shown in TABLE 1 for illustrative purposes only.

Thus, the NMC 24 generates an STP Order message for each STP 16 comprising the message pattern and the gapping parameters appropriate for that particular STP. The Order will also indicate to each STP 16 when only one link set 14 is available to the mate STP 16 and which foreign STP 12 is affected. Thus, in FIG. 3, the STP Order to STP 16b will indicate the failure of link set 14a, from foreign STP 12a to home STP 16a. When an STP 16 receives this STP Order, it prepares individual Link Orders using a two-step process analogous to the preparation of the STP Order thus:

1. Each STP 16 under control of its central processor 34, identifies the affected incoming link sets from the identity of the foreign STPs 12 in the STP Order. If only one link set 14 is active, the total volume is allocated to the remaining active set. If both link sets 14 are active, the volume is divided equally between the two sets, unless a link set failure to the mate is indicated. In this case (as with STP 16b of FIG. 3), the volume is divided with two-thirds allocated to the link set 14b from the affected foreign STP 12a. Volume scaling is again performed as shown in TABLE 2 (for brevity only the Gapping Intervals are shown since the other Parameters are the same throughout, as described earlier).

TABLE 2

Volume Scaling from the STP Order to the Link Set

| Gapping Interval | Type | STP Order Value | Scaling Factor (VS) | Link Set Value | Equivalent Rate |
|---|---|---|---|---|---|
| Example from FIG. 1 | (at STP 16a) | | | | |
| Link set 14a | time | 41.667 ms | 0.5 | 83.333 ms | 12/s |
| Link set 14c | time | 41.667 ms | 0.5 | 83.333 ms | 12/s |
| | (at STP 16b) | | | | |
| Link set 14b | time | 41.667 ms | 0.5 | 83.333 ms | 12/s |
| Link set 14d | time | 41.667 ms | 0.5 | 83.333 ms | 12/s |
| Example from FIG. 3 | (at STP 16a) | | | | |
| Link set 14a | time | 83.333 ms | — | N/A | — |
| Link set 14c | time | 83.333 ms | 1 | 83.333 ms | 12/s |
| | (at STP 16b) | | | | |
| Link set 14b | time | 27.778 ms | 0.667 | 41.667 ms | 24/s |
| Link set 14d | time | 27.778 ms | 0.333 | 83.333 ms | 12/s |

2. The link set volume is allocated to the links available within the link set under control of each of the link processors 30. Volume scaling is again performed as shown in TABLE 3 (again for brevity only the Gapping Intervals are shown since the other Parameters are the same throughout, as described earlier).

TABLE 3

Volume Scaling from the Link Set to the Link

| Gapping Interval | Type | Link Set Value | Links Active in Set | Link Value | Equivalent Rate |
| --- | --- | --- | --- | --- | --- |
| Example from FIG. 1 | (at STP 16a) | | | | |
| Links within Set 14a | time | 83.333 ms | 3 | 250 ms | 4/s |
| Links within set 14c | time | 83.333 ms | 3 | 250 ms | 4/s |
| Example from FIG. 2 | (at STP 16a) | | | | |
| Links within set 14a | time | 83.333 ms | 2 | 166.667 ms | 6/s |
| Links within set 14c | time | 83.333 ms | 3 | 250 ms | 4/s |
| Example from FIG. 3 | (at STP 16b) | | | | |
| Links within set 14b | time | 41.667 ms | 3 | 125 ms | 8/s |
| Links within set 14d | time | 83.333 ms | 3 | 250 ms | 4/s |

Note that in this latter case, if the link set value is a time value, it is multiplied by the number of active links to find the link value. If the link set value is a count value, it is divided by the number of active links to find the value for each link. Where this division does not result in an integer value, then different integer values (rounding the calculated value up and down appropriately) are used for different links in the set so as to provide values that are integer, differ by no more than one and total, for the link set, the link set value.

The STPs 16 then compose a Link Order message for each affected link. The Link Order comprises the message pattern and gapping parameters appropriate for that particular link. The Link Order is sent to the link processor 30 where it is implemented in the SS No. 7 Processing stage.

As the network configuration changes, such as when links go into or out of service, the STPs 16 generate revised Link Orders based on the new configuration. When a full link set 14 goes into or out of service, the home STP 16 associated with that link set notifies the NMC 24 which will in turn revise the STP Orders appropriately to address the revised network configuration. Thus, the control parameters active in the controllers for each link maintain the proper settings, as the network configuration changes, without the need to revise the calculation of the NM Order.

Other Implementations

While the invention is described according to the processes shown in FIGS. 1 to 6, it may readily be extended to cover other implementations including the following:

- allowing more than one message pattern and gapping parameter to be active simultaneously in different parts of the network.
- passing additional parameters in the NM, STP and Link Orders so that additional processing capability may be provided at the link processor 30. A particular example is the passing to the link processor 30 what type of message (if any) to return to the originator if a message is discarded as a result of the message gapping process.
- control of SS No. 7 systems in which processors are not dedicated to each link 14, but instead process messages from a plurality of links.
- this could be applied to other network equipment such as Service Switching Points (SSP)s and Service Control Points (SCP)s to limit the number of calls and messages to be processed.
- the invention can be used with different gapping processes, such as those described above by Crawford, Turner and MacDonald in their respective patent specifications, and may use different processes simultaneously through the preparation of different NM Orders and the implementation of different gapping processes in different link processors.
- other systems of distributed control, where volume decisions must be made locally, but the desire is to limit the total volume allowed in a fair manner.
- standard extension to computer implementation.

What is claimed is:

1. A method of volume screening signalling messages at mated pairs of signal transfer points interconnected with other mated pairs by link sets in a telecommunication system, comprising the steps of:

dividing the signalling messages sent from each signal transfer point of one mated pair to those of another mated pair over links of the link sets;

dynamically apportioning the signalling messages equally amongst available links within each link set;

selecting some of the signalling messages in accordance with volume-screening parameters;

limiting the rate at which the selected signalling messages are accepted by said another mated pair; and dynamically apportioning the acceptance rate of the selected signalling messages from each available link, in the same proportion as that of the total signalling messages sent over that available link.

2. A method of volume screening signalling messages in accordance with claim 1, further comprising:

dividing said signalling messages sent from said one mated pair equally between its signal transfer points;

dynamically apportioning the acceptance rate of the selected signalling messages at each signal transfer point, in the same proportion as that of the total signalling messages sent to that signal transfer point; and dynamically apportioning the acceptance rate of the selected signalling messages from each available link set, in the same proportion as that of the total signalling messages sent over that available link set.

3. A method of volume screening signalling messages in accordance with claim 2, in which the maximum average acceptance rate of the selected signalling messages is one message per gapping interval, further comprising:

setting the gapping interval for each link set to be inversely proportional to the proportion of the total signalling messages sent over that link set; and setting the gapping interval for each link to be inversely proportional to the proportion of the total signalling messages sent over that link.

4. A method of volume screening signalling messages in accordance with claim 2, in which the signal transfer points are interconnected by identical link sets, further comprising:

apportioning the acceptance rate of the selected signalling messages in a successive manner equally between the signal transfer points of said another mated pair, equally amongst the link sets, and equally amongst the links of each link set.

5. A method of volume screening signalling messages in accordance with claim 4, further comprising:

dynamically reapportioning the acceptance rate of the selected signalling messages in response to changes in the volume of signalling messages being received by said another mated pair.

6. A method of volume screening signalling messages at signal points in a telecommunication system, comprising the steps of:

receiving signalling messages at each signal point over links of link sets, dynamically apportioning the received signalling messages equally amongst available links within each link set;

selecting at least some of the signalling messages in accordance with volume-screening parameters; and dynamically apportioning the rate the selected signalling messages are accepted from each available link, in the same proportion as that of the total signalling messages sent over that available link.

7. A method of volume screening signalling messages in accordance with claim 6, further comprising:

dynamically apportioning the acceptance rate of the selected signalling messages from each available link set in the same proportion as that of the total signalling messages sent over that available link set.

* * * * *

UNITED STATES PATENT AND TRADEMARK OFFICE
CERTIFICATE OF CORRECTION

PATENT NO.    : 5,719,930
DATED         : February 17, 1998
INVENTOR(S)   : MacDonald et al It is certified that error appears in the above-indentified patent and that said Letters Patent is hereby corrected as shown below:

Col. 1, line 45:        Delete "muted" and insert --routed--

Signed and Sealed this

Eighteenth Day of August, 1998

Attest:

BRUCE LEHMAN

Attesting Officer          Commissioner of Patents and Trademarks